United States Patent [19]

Shinada

[11] Patent Number: 4,990,763
[45] Date of Patent: Feb. 5, 1991

[54] LIGHT BEAM RECORDER HAVING BEAM DURATION AND INTENSITY CONTROLLED IN ACCORDANCE WITH SCANNING SPEED

[75] Inventor: Hidetoshi Shinada, Kanagawa, Japan

[73] Assignee: Fuji Photo Film Co., Ltd., Kanagawa, Japan

[21] Appl. No.: 343,313

[22] Filed: Apr. 26, 1989

[30] Foreign Application Priority Data

Apr. 27, 1988 [JP] Japan ................ 63-105328

[51] Int. Cl.$^5$ ............................................. G01J 1/32
[52] U.S. Cl. ........................................ 250/205; 250/235
[58] Field of Search ................ 250/235, 236, 205; 358/486, 494, 496, 474, 481, 480

[56] References Cited

U.S. PATENT DOCUMENTS

| | | | |
|---|---|---|---|
| 4,178,064 | 12/1979 | Mrdjen | 350/6.6 |
| 4,616,132 | 10/1986 | Kessler | 250/236 |
| 4,757,191 | 7/1988 | Shimada et al. | 250/205 |
| 4,837,588 | 6/1989 | Imakawa et al. | 346/108 |
| 4,853,535 | 8/1989 | Suganuma | 250/235 |

FOREIGN PATENT DOCUMENTS

62-231923 10/1987 Japan .

*Primary Examiner*—Edward P. Westin
*Assistant Examiner*—George Beck
*Attorney, Agent, or Firm*—Sughrue, Mion, Zinn, Macpeak & Seas

[57] ABSTRACT

A laser beam recorder arranged to record data with dots of a constant size, constant pitch and constant density, irrespective of possible differences in scanning speed between the middle and peripheral portions of a recording medium. The timing of irradiating the recording medium with the light beam is precipitated and the duration of the irradiation with the light beam is shortened as the scanning speed increases, whereby the dot size and dot pitch can be made constant irrespective of variation in the scanning speed. Further, the light beam is intensified as the scanning speed increases. Though the duration of the irradiation with the light beam is reduced with the increasing scanning speed, the amount of energy for recording one dot is maintained constant by intensifying the light beam as described, whereby the dot density can be maintained constant.

14 Claims, 10 Drawing Sheets

LIGHT BEAM RECORDER HAVING BEAM DURATION AND INTENSITY CONTROLLED IN ACCORDANCE WITH SCANNING SPEED

FIELD OF INDUSTRIAL APPLICATION

The present invention relates in general to light beam recorders, and in particular to light beam recorders of the type using a light beam to record information, represented by characters or the like, in the form of a row or rows of dots on a recording medium.

PRIOR ART

An apparatus using a light beam for recording information, represented by characters or the like, is known, for example, from Japanese Laid-open Patent Application No. 67722/1980 which discloses a Laser Computer Output Microfilmer (LASERCOM) in which a laser beam is scanned in accordance with computer-output information to directly record information of characters or the like on a recording medium such as a microfilm. The LASERCOM comprises: an argon laser for generating a laser beam; a light modulator for modulating the laser beam in accordance with character information; a rotating polygon mirror for deflecting the laser beam modulated by the light modulator, in such a manner that the beam is swept in a principal scanning direction; and a galvanometer equipped with a deflecting mirror for deflecting light reflected from the rotating polygon mirror in such a manner that the reflected light is swept in a subsidiary scanning direction The arrangement is such that information such as characters or the like are recorded on a recording medium by two-dimensionally scanning the laser beam from the light modulator through a scanning lens over the recording medium using the rotating polygon mirror and the galvanometer. The rotating polygon mirror is driven by a motor so as to rotate at a constant speed in order to deflect the laser beam in the principal scanning direction; it is very difficult to make the polygon mirror rotate at a constant speed and in fact the rotating speed will vary to a some degree resulting in a distorted recording pattern having a deviation in the position of dots or scanned points from the ideal pattern. On the other hand, where a polygon mirror is rotated at a constant speed to deflect a light beam for recording characters on a planar recording medium, there is a problem in that the pitch of the dots is not constant because marginal portions of the recording medium are more distant from the rotating polygon mirror than the middle portion of the recording medium. As a result the scanning speed is faster at the marginal portions than at the middle portion. This makes the spacing between consecutive dots wide at the marginal portions. However, they become narrower toward the middle portion.

A laser recorder is known from U.S. Pat. No. 3389403, which uses a reading laser beam in addition to a recording laser beam. The reading laser beam is deflected by a rotating polygon mirror so as to scan a linear encoder having a plurality of slits juxtaposed with a fixed pitch aligned in the direction of deflection. A photoelectric pulse signal obtained by the linear encoder is input into a character generator such as a video clock signal for generating a video signal in accordance with the scanning position of the rotating polygon mirror, whereby dots can be recorded in correct positions.

PROBLEMS WHICH THE INVENTION ATTEMPTS TO SOLVE

However, there is a problem in that, though a constant pitch of the dots may be achieved, the density of the dot is not constant, i.e. dots in the middle portion of the recording medium are more dense than those in the peripheral portions, since, as stated previously, the scanning speed is slower at the middle portion of the recording medium than at the peripheral portions and as a result the amount of energy of light used to record one dot is larger at the middle portion than at the peripheral portions. Similarly, in the case of a resonant scanner using a sinusoidally oscillating deflecting mirror in place of a rotating polygon mirror, a constant dot pitch may be achieved but dots are more dense in the middle portion than in the peripheral portions since the scanning speed is higher in the middle portion than in the peripheral portions. When the resonant scanner is used, with the scanning efficiency being assumed to be 70%, there occurs a distortion of about 10% between the middle and peripheral portions of the image recording area; it is difficult to make the dot pitch constant by correcting distortion of the lens system, since the lens system is capable of correcting distortion of about 2-3%.

The present invention has been made in an attempt to solve the above-mentioned problems, and its one object is to provide a light beam recorder which can record information with dots having an identical density and a constant pitch.

MEASURES TO SOLVE THE PROBLEMS

To solve the problems, the present invention includes: a light source for generating a light beam; a means for scanning the light beam generated by said light source over a recording medium, and a control means for establishing the timing of irradiating the recording medium with said light beam and shortening the duration of irradiation with the light beam in accordance with recorded information as the scanning speed is increased, and for intensifying said light beam as the scanning speed increases.

OPERATION

The scanning means according to the present invention will deflect a light beam generated by a light source in a principal scanning direction of a recording medium in order to sweep the light beam in the principal scanning direction for scanning The control means will increasingly initiate the timing of irradiation of the recording medium with the light beam and shorten the duration of the irradiation with the light beam in accordance with information to be recorded in the recording medium. Thus, by increasing the imitation of the irradiation timing and shortening the irradiation timing interval as the scanning speed is increased, it is possible to make constant the product of the length of time during which the light beam moves and the scanning speed, i.e. the displacement of the light beam, whereby the pitch between dots successively recorded in a recording medium, can be made constant. Also, since the duration of irradiation with the light beam is increasingly shortened as the scanning speed increases, the displacement of the light beam required to record a single dot can be made constant Also the size of dots can be made constant. Further, the control means will increasingly intensify the light beam as the scanning speed increases. By intensifying the light beam as the scanning speed increases, the product of the light beam intensity and the irradiation duration, i.e. the amount of energy required to record a single dot, can be made constant and thereby the dot density can be made constant, even if the irradiation duration is varied by the control means.

EFFECTS OF THE INVENTION

In accordance with the present invention, the duration of irradiation of the light beam is shortened and the light beam is intensified as the scanning speed is increased. The product of the irradiation duration and the intensity, i.e. the amount of light energy required to record a single dot, can thereby be advantageously made constant. Further, the timing of light beam irradiation and the irradiation duration are controlled depending on the scanning speed The pitch and size of dots can thereby be advantageously made constant and hence recording can be performed with dots having a constant pitch therebetween, a constant size, and a constant density, irrespective of changes in the scanning speed.

BRIEF DESCRIPTION OF THE DRAWINGS

The present invention will now be described by way of example, with reference to the accompanying drawings, in which:

FIG. 6(1) is an illustration showing an image recording area of a recording medium;

FIG. 6(2) is a diagram showing an exemplary video signal;

FIGS. 7(1) and 7(2) are diagrams showing variations of a rotational angle and speed, respectively;

EMBODIMENTS

Figure 1:
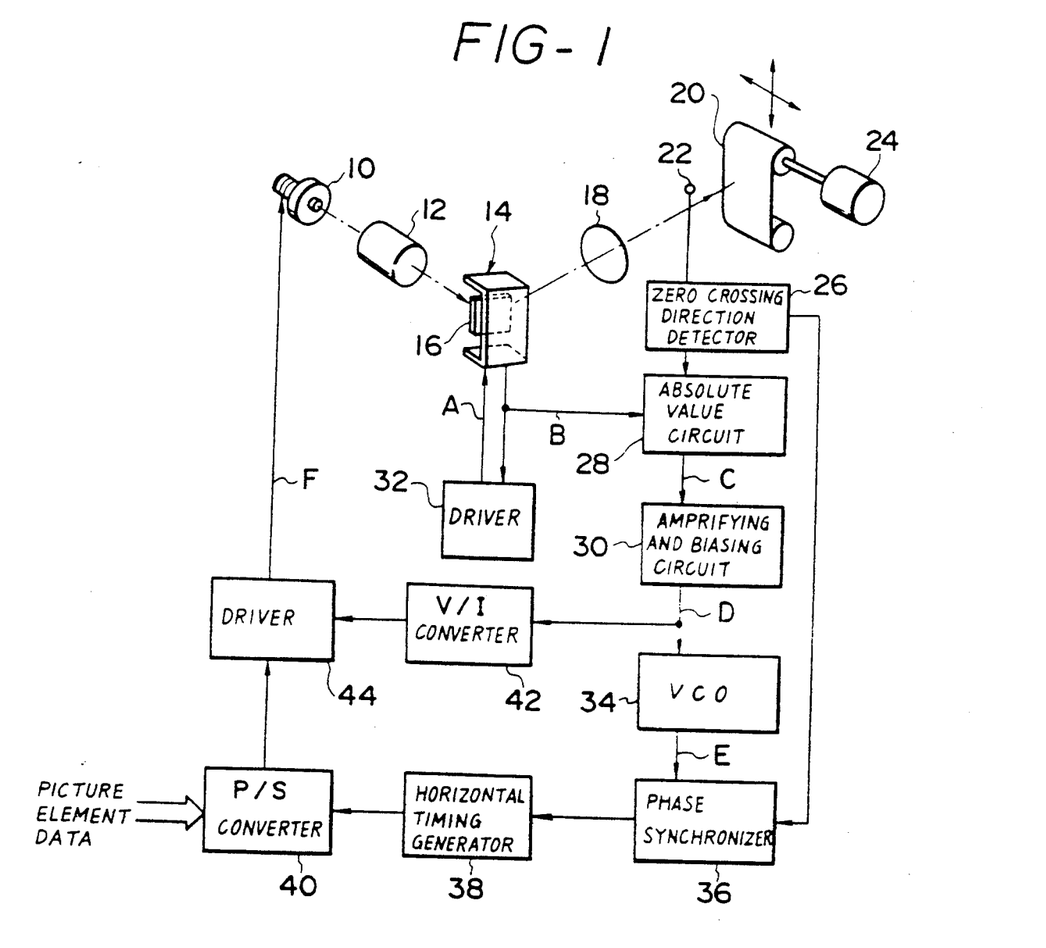
FIG. 1 is a block diagram of a first embodiment of the present invention.

Embodiments of the present invention will now be described in detail with reference to the drawings. FIG. 1 is a block diagram showing an optical system and a control system of a first embodiment of a light beam recorder according to the present invention which are used for recording character information or the like on microfilm. The optical system of the light beam recorder is used for scanning a recording laser beam in a principal scanning direction and for imaging on a recording medium. The control system is for controlling the optical system and at the same time controlling the carrying of the recording medium at a predetermined speed in a subsidiary scanning direction.

Figure 2:
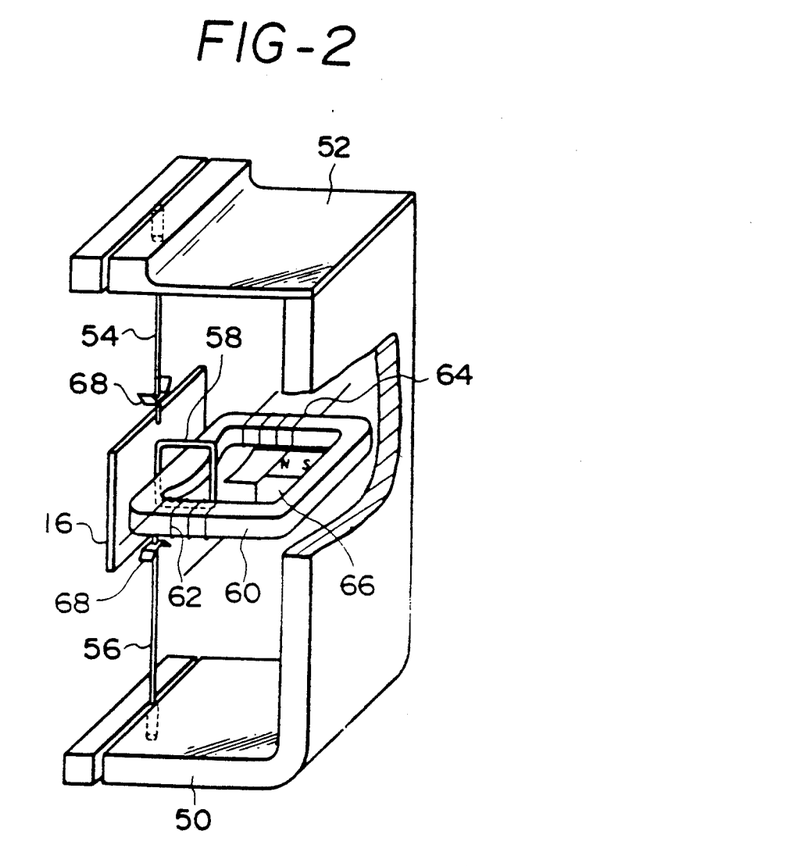
FIG. 2 is a perspective view showing the details of a resonant scanner.

First, the optical system will be described, with reference to FIGS. 1 and 2. The optical system has a semiconductor laser 10 for generating a laser beam, which can be turned on and off.

A collimator 12 is provided on the laser-beam-projecting side of the semiconductor laser 10 so as to collimate the laser beam from the semiconductor laser 10 into a parallel light beam. To deflect the laser beam emitted from the collimator 12 for sweeping in the principal scanning direction, a resonant scanner 14 is placed on the laser-beam-projecting side of the collimator 12 for causing a deflecting mirror 16 to oscillate in a resonating manner in accordance with a sinusoidal oscillation represented by the following equation (1):

$$\phi = \phi_0 \sin \omega t \qquad \ldots (1).$$

where $\phi$ represents the angle of rotation of the scanner 14, $\phi_0$ represents the amplitude of the resonant scanner 14, $\omega$ represents an angular frequency and t represents time.

On the laser-beam-projecting side of the resonant scanner 14, there is placed a scanning lens 18 having a focal plane position on a recording medium 20. Between the scanning lens 18 and the recording medium 20, a photoelectric converter 22 is provided As shown in FIG. 2, the resonant scanner 14 includes a frame comprising an L-shaped member 50 having a flat spring 52 fixed thereto at one end thereof. A deflecting mirror 16 is positioned between the bottom surface of the L-shaped member 50 and the flat spring 52. The deflecting mirror 16 has a top side connected to the flat spring 52 through a torsion bar 54, and a bottom side connected to the bottom surface of the L-shaped member 50 through another torsion bar 56. An armature coil 58 is fixed to the rear surface of the deflecting mirror 16. A ring-shaped iron core 60 extends through the armature coil 58. A speed detecting coil 64 for detecting the rotating speed of the deflecting mirror 16, together with a drive coil 62 for moving the armature coil 58, thereby resonating the deflecting mirror 16 for oscillation, are wound around the iron core 60. Sixty-six 66 designates a permanent magnet, and 68 designates a turning tab In the present scanner, a pulsed electric current supplied to the drive coil 62 will move the armature coil 58 in a predetermined direction. An interruption of such electric current causes the deflecting mirror 16 to return to its original position at this time the torsion bars 54 and 56 exert a torsional force causing the deflecting mirror 16 to oscillate in an resonating manner. A electric current which is generated by the movement of the armature coil 58 is detected by the speed detecting coil 64.

Next, the control system of the above-mentioned laser beam recorder will be described. The control system includes a drive circuit 32 for supplying a driving signal A to the drive coil 62 of the resonant scanner 14' and a zero crossing direction detecting circuit 26 connected to the photoelectric converter 22. The zero crossing direction detecting circuit 26 is connected to an absolute value circuit 28 which in turn is connected to receive a speed signal B from the speed detecting coil 64 of the resonant scanner 14. The absolute value circuit 28 is connected, via an amplifying and biasing circuit 30 for amplifying the output from the absolute value circuit 28 and adding a predetermined bias to the amplified output, to a VCO 34 for generating a signal having a frequency which is proportional to the voltage, and to a V/I converting circuit 42 for converting a voltage V into an electric current. The VCO 34 is connected to a phase synchronizing circuit 36 to which said zero crossing direction detecting circuit 26 is connected. The phase synchronizing circuit 36 is connected to the drive circuit 44 through a horizontal timing generating circuit 38 and through a P/S converting circuit 40 which converts parallel signals P into a serial signal S. Picture element data is input into the P/S converting circuit 40. The V/I converting circuit 42 is likewise connected to the drive circuit 44 connected to the semiconductor laser 10.

Figure 3:
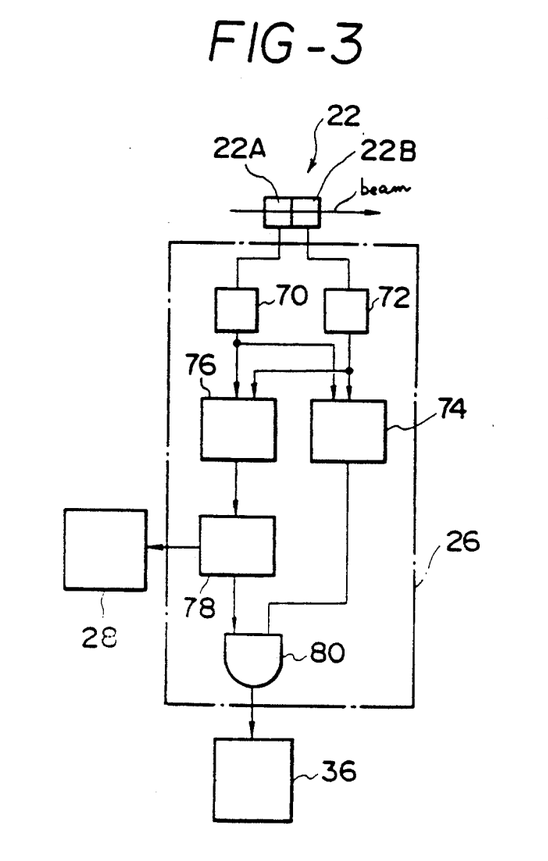
FIG. 3 is a block diagram showing the details of zero crossing direction detecting circuit.

As shown in FIG. 3, the photoelectric converter 22 comprises a pair of juxtaposed photo detectors 22A and 22B, of which the photo detector 22A is connected via an amplifier 70 to a subtracter 76 and to a direction detecting circuit 74. On the other hand, the other photo detector 22B is connected via another amplifier 72 to subtracter 76 and to direction detecting circuit 74. The subtracter 76 will provide an output, which is the output from the amplifier 70 minus the output from the amplifier 72, to the zero crossing detecting circuit 78. Because the output from the subtracter 76 will vary generally sinusoidally as the laser beam traverses the photoelectric detector 22, it is possible to detect the time point at which the output from the amplifiers 70 and 72 become equal to each other, i.e. the time point at which the laser beam passes midway between the two photo detectors 22A and 22B, by detecting zero crossing points of the sinusoid. The zero crossing detecting circuit 78 is connected to the absolute value circuit 28 and to an AND gate 80. The direction detecting circuit 74 will determine whether the light beam has passed in the direction from the photo detector 22A to the other photo detector 22B, or in the reversed direction, depending on the outputs from the amplifiers 70 and 72. The output from the direction detecting circuit 74 is supplied to the AND gate 80 whose output is supplied to the phase synchronizing circuit 36. By detecting the direction in which the light beam has passed by means of the direction detecting circuit 74 and delivering a signal, selection can be made between a principal scanning in a single direction and a reciprocating principal scanning.

Figure 4:
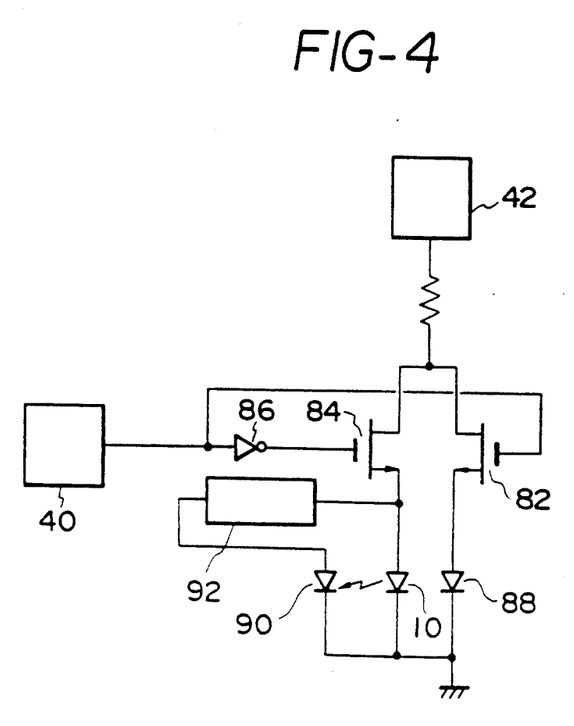
FIG. 4 is a block diagram showing the details of a driving circuit.

FIG. 4 shows the details of the driver circuit 44 as well as the connection of the drive circuit 44 and the semiconductor laser 10, wherein the output of the P/S converting circuit 40 is connected via an inverter 86 to a differential current switch 84, and further to another differential current switch 82. An electric current I for determining the intensity of light is supplied from the V/I converting circuit 42 to the differential current switches 82 and 84. The differential current switch 82 is connected to ground via a dummy diode 88, while the other differential current switch 84 is connected to ground via the semiconductor laser 10. A series circuit, comprising a photodiode 90 for detecting light emitted from the semiconductor laser 10 and an automatic light quantity controlling circuit 92, is connected in parallel with the semiconductor laser 10, which is arranged in such a way as to automatically increase the intensity of the electric current, thereby increasing the light quantity to a constant value corresponding to the electric current I from the V/I converting circuit 42 when the photodiode 90 receives small quantities of light.

Figure 5:
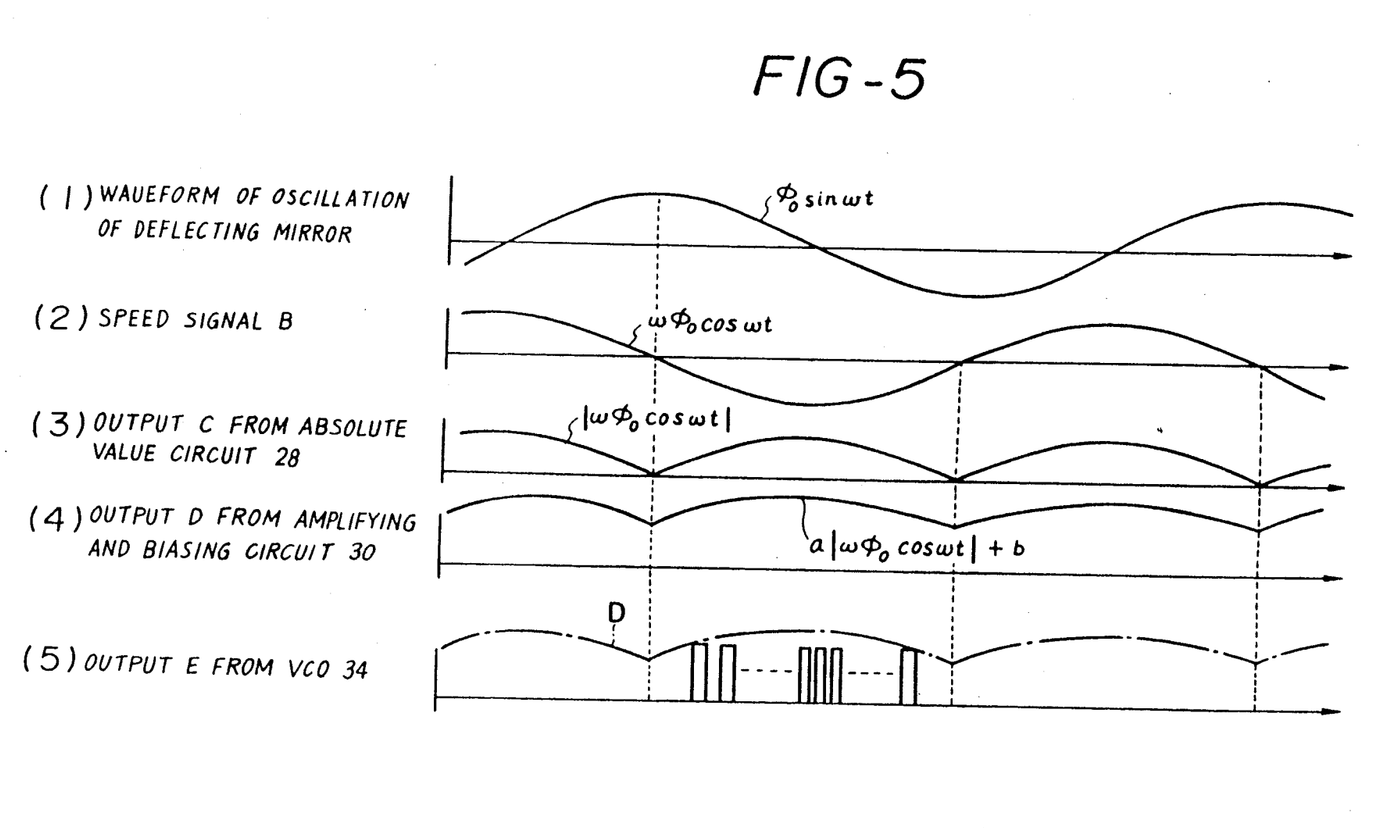
FIG. 5 is a diagram showing waveforms occurring at portions of FIG. 1.

Next, the operation of the embodiment of the invention will be described, with reference to FIGS. 1 and 5. The drive circuit 32 supplies a pulsed drive signal A, so that the deflecting mirror 16 is resonated in accordance with the sinusoidal wave expressed in the equation (1) above. Consequently, the deflecting mirror 16 is resonated in accordance with the waveform shown at (1) in FIG. 5, and a speed signal B shown at (2) in FIG. 5 is obtained from the speed detecting coil 64 of the resonant scanner 14. At this time, if the semiconductor laser 10 is emitting a laser beam, then a parallel light beam is thrown via the collimator 12 to the resonant scanner 14, and the parallel light beam reflected from the resonant scanner 14 is directed onto and swept over the recording medium When the photoelectric converter 22, that is positioned between the scanning lens 18 and the recording medium 20, has detected the passing laser beam, the zero crossing direction detecting circuit 26 will provide a signal indicative of the passing of the laser beam to the absolute value circuit 28, and another signal indicative of its direction to the phase synchronizing circuit 36. In response to the signal indicative of the passing of the laser beam from the zero crossing direction detecting circuit 26, the absolute value circuit 28 will derive the absolute value of the speed signal B and will provide this as its output C shown at (3) in FIG. 5 to the amplifying and biasing circuit 30. The amplifying and biasing circuit 30 will amplify the output C from the absolute value circuit 28 by a gain a and will add a predetermined bias b to the amplified output, and will provide it to the VCO 34 and to the V/I converting circuit 42 as its output D shown at (4) in FIG. 5. Thus, the V/I converting circuit 42 will provide to the drive circuit 44 a current I which is proportional to the output D from the amplifying and biasing circuit 30 i.e. a current I having a waveform similar to that which is shown at (4) in FIG. 5 and which varies along the convex portions of a cosine curve as the sweeping speed increases.

On the other hand, the VCO 34 will output a signal E having a frequency which is proportional to the output D from the amplifying and biasing circuit 30, i.e. a signal E consisting of a pulse train whose pulse width becomes maximum (i.e. whose frequency becomes minimum) at a point where the speed signal B is zero, and whose pulse width becomes minimum (i.e. whose frequency becomes maximum) at a point where the amplitude of the speed signal B is maximum. The output from the VCO 34 is phase corrected by the phase synchronizing circuit 36 for coordinating the phase within one principal scanning cycle in accordance with the signal indicative of the laser beam direction from the zero crossing direction detecting circuit 26, and is provided to the P/S converting circuit 40 by the horizontal timing generating circuit 38 at a recording starting point. Picture element data represented by parallel signals is converted into a serial signal by the P/S converting circuit 40 in accordance with the output from the horizontal timing generating circuit 38, of which the converted signal is supplied to the drive circuit 44. FIG. 6(1) shows an image recording area 21 of the recording medium. The drive circuit 44, receiving the current I from the V/1 converting circuit 42, provides an output, i.e. a video signal F which as shown in FIG. 6(2) has smaller amplitudes and larger pulse widths at peripheral portions of the image recording area 21 shown in FIG. 6 (1) and has larger amplitudes and smaller pulse widths at the middle portion of the image recording area. Thus, the product of amplitude or power P1 and pulse width W1 is equal to the product of amplitude P2 and pulse width W2, and the energy for recording one dot is the same throughout the image area.

Next, the quantities corrected due to scanning speed variations will be described.

The scanning speed v of the laser beam on the recording medium surface may be expressed by the following equation (2) which is derived by differentiating the above-noted expression (1):

$$v = \frac{d\phi}{dt} = \phi_0 \omega \cdot \cos\omega t. \quad (2)$$

The varying waveforms of the angle of rotation $\phi$ and the speed v are shown at (1) and (2) in FIG. 7.

Assuming that the scanning efficiency $\eta$ is k, and the effective angle of rotation of the deflecting mirror is within the range of $-k\phi_0 \leq \phi \leq k\phi_0$, the range of speed variations may be expressed as follows:

$$\phi_0 \cdot \omega \cdot \cos(\sin^{-1}k) < v < \phi_0 \cdot \omega \quad \ldots (3)$$

Assuming that the scanning efficiency n=70%, $$\cos(\sin^{-1} 0.7) \approx 0.71$$

which means that the speed must be varied by 71% from the image center along the cosine curve.

The quantities which must be actually corrected will be calculated. Assuming that the maximum value of the period to be corrected is $T_1$, and since the correction is made along the cosine curve, the period summation of corrected intervals is expressed as follows:

$$\frac{1}{f} \cdot \frac{1}{2} \cdot h = 2 \sum_{n=0}^{m/2} T_1 \cdot \cos\omega \quad (4)$$

$$\left( \frac{\sin^{-1}k}{\omega} \cdot \frac{2n}{m} \right).$$

Here, for example, f represents the frequency and m represents the dot rate which amounts to 3,360 dots/ 7.2 mm.

By substituting the following expression (5) for the expression (4):

$$\sum_{r=1}^{n} \cos[x + (r-1)\theta] = \quad (5)$$

$$\cos\left[ x + \frac{(n-1)\theta}{2} \right] \cdot \sin\frac{n\theta}{2} / \sin\frac{\theta}{2}$$

and assuming that x=0, n=m/2, $\theta=2\sin^{-1}k/m$, and $r-1 \equiv r$, then the following expression can be obtained:

$$\text{right side} = 2 \sum_{r=0}^{m/2} \cos r \cdot \frac{2\sin^{-1}k}{m}$$

$$= \cos\left[ \frac{(m/2 - 1) \cdot \sin^{-1}k}{m} \right].$$

$$\sin\left( \frac{m/2 \cdot 2\sin^{-1}k}{2m} \right) / \sin\left( \frac{\sin^{-1}k}{m} \right)$$

$$= \cos\left[ \frac{(m-2) \cdot \sin^{-1}k}{2m} \right].$$

$$\sin\left( \frac{\sin^{-1}k}{2} \right) / \sin\left( \frac{\sin^{-1}k}{m} \right)$$

Thus, the following expression can be obtained:

$$T_1 = \frac{k \cdot \left( \frac{\sin^{-1}k}{m} \right)}{4f \cdot \cos\left[ \frac{(m-2) \cdot \sin^{-1}k}{2m} \right] \cdot \sin\left( \frac{\sin^{-1}k}{m} \right)} =$$

46.15 (nsec).

Thus, in this example, the period is 46.15 (nsec) i.e. the frequency is 21.67 MHz, in the peripheral portions. For the middle portion, $$k_2 T_1 = T_1 \cos\omega \left( \frac{\sin^{-1}k}{\omega} \cdot \frac{2 \cdot m/2}{m} \right)$$

$$= T_1 \cos(\sin^{-1}k)$$

so that $$k_2 = \cos(\sin^{-1} 0.7) = 0.71$$

and thus $$k_2 T_1 = 0.71 \times 46.15 = 32.31 \text{ (nsec)}.$$

Figure 8:
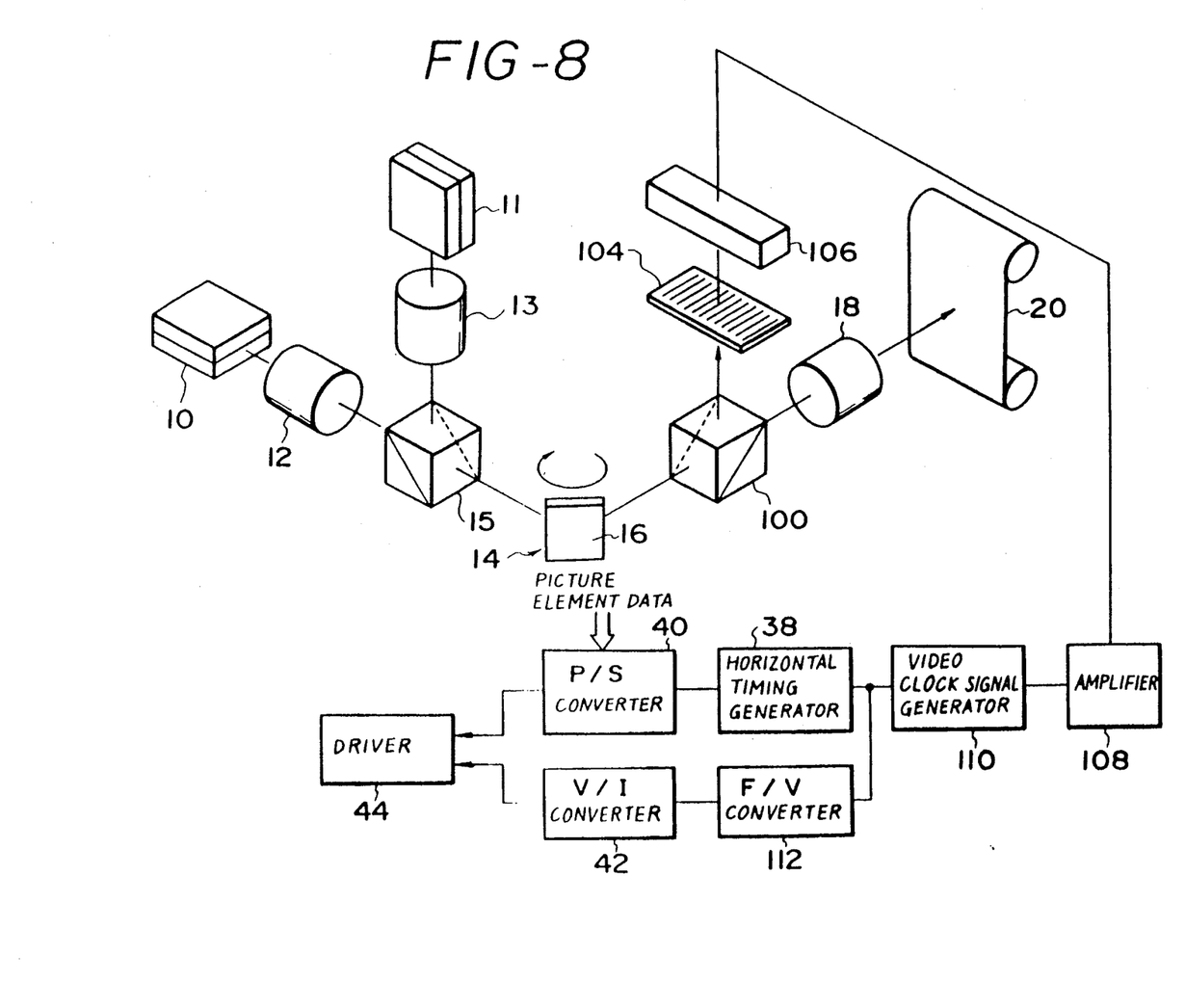
FIG. 8 is a block diagram of a second embodiment of the present invention.
Figure 10:
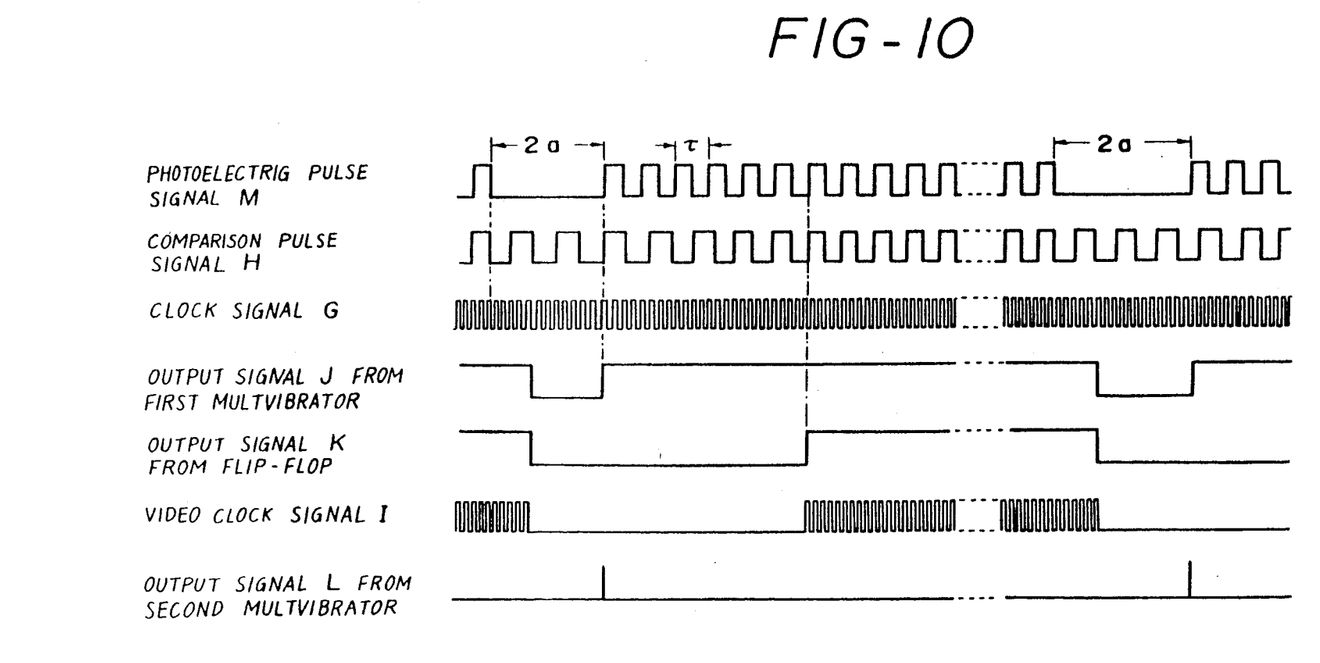
FIG. 10 is a diagram showing waveforms occurring at portions of FIG. 9.

Thus, in this example, the period is 32.31 (nsec), i.e. the frequency is 30.95 MHz, in the middle portion A second embodiment of the present invention will next be described, with reference to FIG. 8. In FIG. 8, parts having corresponding elements in FIG. 1 are designated by corresponding marks and will not be described again. A semiconductor laser 11 for generating a video clock signal is placed such that the p-n junction plane is orthogonal to the p-n junction plane of another semiconductor laser 10 for emitting a writing laser beam. Between a collimator 12 and a resonant scanner 14, there is placed a polarizing beam splitter 15, and between the polarizing beam splitter 15 and the semiconductor laser 11 there is placed another collimator 13. Between the resonant scanner 14 and a scanning lens 18, there is placed a polarizing beam splitter 100. The laser beam reflected from the polarizing beam splitter 100 is directed toward a linear encoder 104. The linear encoder 104 comprises an opaque plate having a large number of elongated transparent portions of the same width formed therein with a constant pitch therebetween. When the linear encoder 104 is horizontally scanned, a photoelectric converter 106 will output a photoelectric pulse signal M which is amplified by an amplifier 108 to a predetermined level. The photoelectric pulse signal M is shown in FIG. 10. The photoelectric pulse signal M has blanking intervals of duration 2a which correspond to the light beam scanning opaque portions of the linear encoder 104 adjacent to the opposite ends thereof; the photoelectric pulses between one blanking interval and the next blanking interval is generated by one horizontal scanning cycle of the deflecting mirror 16. The period $\tau$ will vary with the scanning speed determined by the deflecting mirror 16, i.e. the period becomes shorter as the scanning speed increases and becomes longer as the scanning speed decreases.

Figure 9:
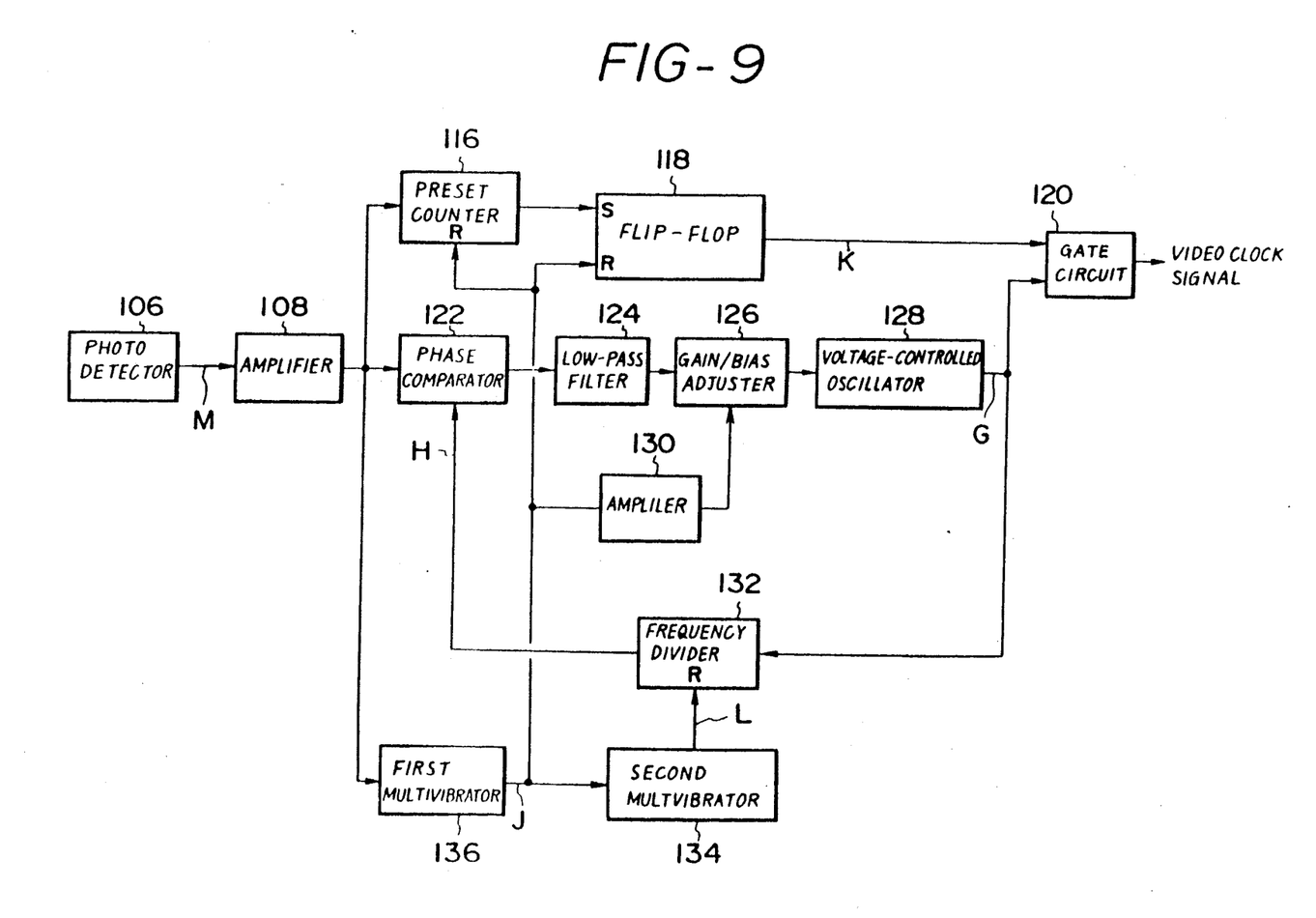
FIG. 9 is a block diagram showing the details of the video clock signal generating circuit shown in FIG. 8.

The photoelectric pulse signal M is supplied to a video clock signal generating circuit 110 via an amplifier 108. The video clock signal generating circuit 110 will be described, with reference to FIG. 9. Waveforms occurring at various parts of FIG. 9 are shown in FIG.

10. A PLL circuit, consisting of a phase comparator 122, a low-pass filter 124, a gain/bias adjusting circuit 126, a VCO (voltage-controlled oscillator) 128, and a frequency divider 132, will multiply the photoelectric pulse signal M by a predetermined factor. That is, the VCO 128 will output a clock signal G which is divided by the frequency divider 132 into a fraction of 1/N. The divided comparison pulse signal H is input into the phase comparator 122 which compares its phase with that of the photoelectric pulse signal M. If the phases do not correspond to each other, then a signal is delivered which has a pulse width varying depending on the direction and magnitude of the lag. This pulse signal is converted into a direct current by the low-pass filter 124 and provided to the gain/bias adjusting circuit 126. The gain/bias adjusting circuit 126 will output a d.c. voltage whose level varies such that the phase lag is corrected, and such d.c. current is applied to the VCO 12B. Thus, the PLL circuit is feedback controlled in such a way that the phase of the photoelectric pulse signal M will correspond to that of the comparison pulse signal H; at the moment the phases come to correspond together, phase locking control is effected and the VCO 128 will output a clock signal G whose timing corresponds to the photoelectric pulse signal M and whose frequency is that of the photoelectric pulse signal M multiplied by a factor of N.

The photoelectric pulse signal M is input into a first retriggerable multivibrator 136. The first multivibrator 136 has a time constant which is set to be longer than the period of the photoelectric pulse signal M. The first multivibrator 136 has a low level output after the completion of the immediately preceding horizontal scanning cycle, and is turned high when triggered by the first pulse of the photoelectric pulse signal M occurring in the next horizontal scanning cycle The output signal J from the first multivibrator 136 is supplied to reset terminals of a pre-set counter 116 and of a flip-flop 118, resetting these with its rising edge.

The pre-set counter 116 counts a predetermined number of pulses in order to invalidate the pulses of the photoelectric pulse signal M occurring while the PLL circuit is locked up. When it has counted the predetermined number of pulses, it will reset the flip-flop 118. The output signal K from the flip-flop 118 is input into a gate circuit 120 and opens this gate. Since the gate circuit 120 also receives the clock signal G from the VCO 128, the gate circuit 120 is opened when the flip-flop 120 is set, whereby the clock signal G is output therefrom as the video clock signal.

Thus, the locking up time is converted into a corresponding number of pulses of the photoelectric pulse signal; the number of pulses is counted by the counter 116; when the predetermined number has been reached and the phase locking control has been effected, the flip-flop 118 is set to open the gate circuit 120, whereby the clock signal G can be taken out as the video clock signal. A stable video clock signal can thus be obtained whose timing corresponds to that of the photoelectric pulse signal M and whose frequency is that of the photoelectric pulse signal M multiplied by a factor of N. Since a longer duration of the locking up will make the effective scanning line length shorter and will reduce the solution, the duration of the locking up is determined depending on the difference in phase and frequency between the photoelectric pulse signal M and the comparison pulse signal H. Thus, the amount of phase correction is small and the locking up is quickened if such differences are small. In view of this, the output signal J from the first multivibrator 136 is input onto a second multivibrator 134 having a very short period; the frequency divider 132 is set by the pulse signal L from the second multivibrator 134; these two are forcibly synchronized at the beginning point of the first pulse of the photoelectric pulse signal; whereby the amount of phase correction is reduced and the duration of the locking up is shortened. Between the first multivibrator 136 and the gain/bias adjusting circuit 126 there is connected an amplifier 130 which, while the phase locking control is effected, amplifies the output signal from the first multivibrator 136 in such a manner that a d.c..current of the same level as the d.c. current output from the gain/bias adjusting circuit 126 will also be output during blanking periods.

Figure 6:
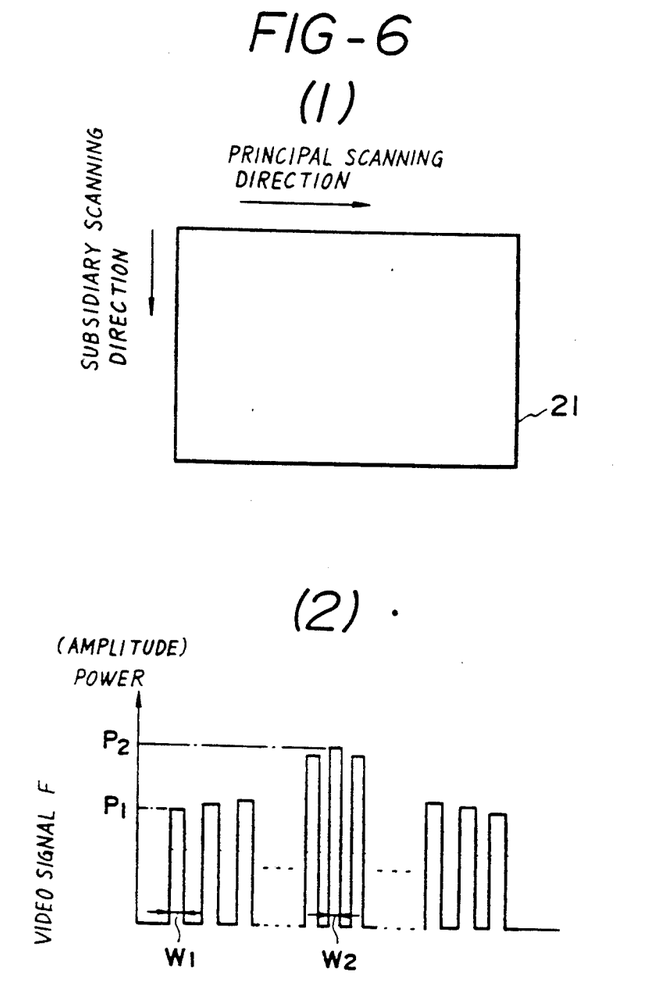
Figure 7:
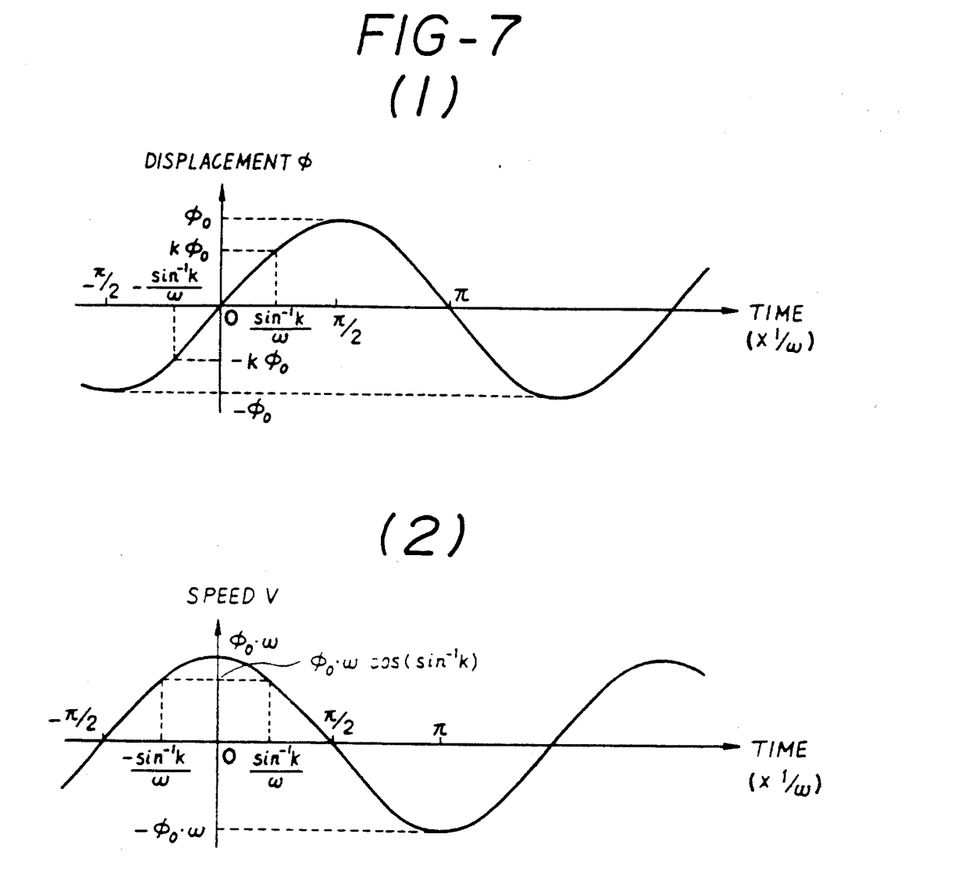

As in the first embodiment, the video clock signal from the video clock signal generating circuit 110 is supplied to the drive circuit 44 via the horizontal timing generating circuit 38 and via the P/S converting circuit 40. Meanwhile, an F/V converting circuit 112 is connected to the video clock signal generating circuit 110; the circuit 112 provides a voltage V which is proportional to the frequency F of the video clock signal. The output from the F/V converting circuit 112 is connected to the drive circuit 44 via the V/1 converting circuit 42. Therefore, a video signal can be obtained which is similar to the one shown at (2) in FIG. 6.

The above-described embodiments use a resonant scanner to perform the principal scanning operation. The present invention however is also applicable to arrangements where the principal scanning operation is performed using a rotating polygon mirror or a galvanometer. Further, though the described embodiments use a semiconductor laser as the light source, and argon laser or a light modulator can also be used as in the case of the LASERCOM. Further, the horizontal timing circuit may be provided as required; a phase-shifting circuit for shifting the phase by a predetermined amount may be provided at the output of the amplifying and biasing circuit.

I claim:
1. A light beam recorder comprising:
   a light source, for generating a light beam;
   means for modulating said light source with recording information;
   means including an oscillating mirror for scanning said modulated light beam, generated from said light source, in a sequence of scans over a recording medium;
   means for directly detecting the speed of said mirror during a scan of said light-beam; and
   control means responsive to said means for detecting for establishing for each scan the timing of irradiating the recording medium with said light beam and shortening the duration of irradiation with the light beam in accordance with said recording information as the scanning speed is increased, and for intensifying said light beam as the scanning speed increases.
2. The light beam recorder as claimed in claim 1, wherein said control means comprises:
   means for outputting a pulse train signal having a pulse width which is made smaller as the scanning speed increases;
   means for outputting a signal which is proportional to the scanning speed; and means for controlling the timing of irradiating the recording medium with said light beam, the duration of the irradiation and the intensity, in dependence on said pulse train signal, said signal proportional to said scanning speed, and the recorded information.

3. The light beam recorder as claimed in claim 2, wherein said means for controlling the timing of irradiating the recording medium with said light beam, the duration of the irradiation and the intensity, controls said light source by turning on and off said light source in accordance with the recorded information and said pulse train signal, and controls the magnitude of the current through said light source in accordance with said scanning speed.

4. The light beam recorder as claimed in claim 2, wherein said means for outputting said pulse train signal comprises:
  a sensor detecting the scanning speed by said scanning means and outputting a voltage signal; and
  a voltage-controlled oscillator connected to said sensor and providing an output whose frequency varies depending on the voltage applied thereto.

5. The light beam recorder as claimed in claim 2, wherein said means for outputting said pulse train signal comprises:
  a linear encoder having a large number of opaque portions and transparent portions alternating with each other with a constant pitch, and swept by the scanning light beam; and
  a photoelectric converter for converting the light beam having passed through said linear encoder into an electric signal.

6. A light beam recorder comprising:
  a semiconductor laser for generating a laser beam;
  means including an oscillating mirror for scanning said laser beam generated by said semiconductor laser over a recording medium in order to record input information;
  means for directly detecting the oscillating speed of said mirror for outputting a speed signal;
  means for outputting a pulse train signal whose pulse width is made smaller in dependence on said speed signal as the oscillating speed increases;
  means for outputting a signal which is proportional to said speed signal; and
  control means responsive to said proportional signal and said input information for controlling said semiconductor laser by turning on and off said semiconductor laser in dependence on the input information and on the pulse train signal, and for controlling the electric current through said semiconductor laser in dependence on said signal which is proportional to said speed signal.

7. The light beam recorder as claimed in claim 6, wherein said scanning means is a resonant scanner.

8. The light beam recorder as claimed in claim 6, wherein said pulse train signal outputting means comprises:
  means for outputting an absolute value signal which corresponds to the absolute value of said speed signal;
  means for biasing said absolute value signal by adding a predetermined voltage to said absolute value signal, and outputting the thus obtained biased signal; and
  means for outputting a pulse train signal having a frequency which increases as the level of said biased signal rises.

9. The light beam recorder as claimed in claim 8, wherein said means for outputting the signal which is proportional to said speed signal is a voltage-to-current converter for converting said biased signal into an electric current which is proportional to the level of the biased signal.

10. The light beam recorder as claimed in claim 9, wherein said control means depends on the recorded information and on said pulse train signal for turning on or off the semiconductor laser when said pulse train signal is at a high or low level, respectively, and for supplying the current from said voltage-to-current converter to the turned-on semiconductor laser.

11. A light beam recorder comprising:
  a first semiconductor laser for generating a laser beam for recording;
  a second semiconductor laser for generating a laser beam for generating a video clock signal;
  means for synthesizing the laser beam for recording and the laser beam for generating the video clock signal in such a manner that the optical paths of these two laser beams coincide;
  means for scanning said synthesized laser beams in a principal scanning direction;
  means for separating said laser beam for generating video-clock-signal from said recording laser beam at a location between said scanning means a recording medium;
  means responsive to said laser beam for generating a video clock signal for generating a pulse train signal in dependence on said video-clock-signal laser beam separated by said separating means, said pulse train signal having a pulse width which is made smaller as the scanning speed increases;
  means for outputting a signal which is proportional to the frequency of said video clock signal; and
  control means for controlling said first semiconductor laser by turning on and off said first semiconductor laser in dependence on the recorded information on said video clock signal, and for controlling the electric current through said first semiconductor laser in dependence on said signal which is proportional to the frequency of said video clock signal.

12. The light beam recorder as claimed in claim 11, wherein said video clock signal generating means comprises
  a linear encoder having a large number of opaque and transparent portions alternating with each other with a constant pitch and swept by the separated video-clock-signal generating laser beam, and
  means for converting the light beam having passed through said linear encoder into an electric, video clock signal.

13. The light beam recorder as claimed in claim 11, wherein said means for outputting a signal which is proportional to the frequency of said video clock signal comprises:
  means for outputting a voltage which is proportional to the frequency of said video clock signal; and
  means for outputting an electric current which is proportional to said voltage.

14. The light beam recorder as claimed in claim 13, wherein said control means will turn on or off said semiconductor lasers when said video clock signal is at a high or low level, respectively, in dependence on the recorded information and on said video clock signal, will supply to the turned on semiconductor lasers an electric current which is proportional to said voltage.

* * * * *